Feb. 25, 1936. C. C. BUCKELS 2,031,689
OUTLET BOX
Filed June 8, 1935 2 Sheets-Sheet 1
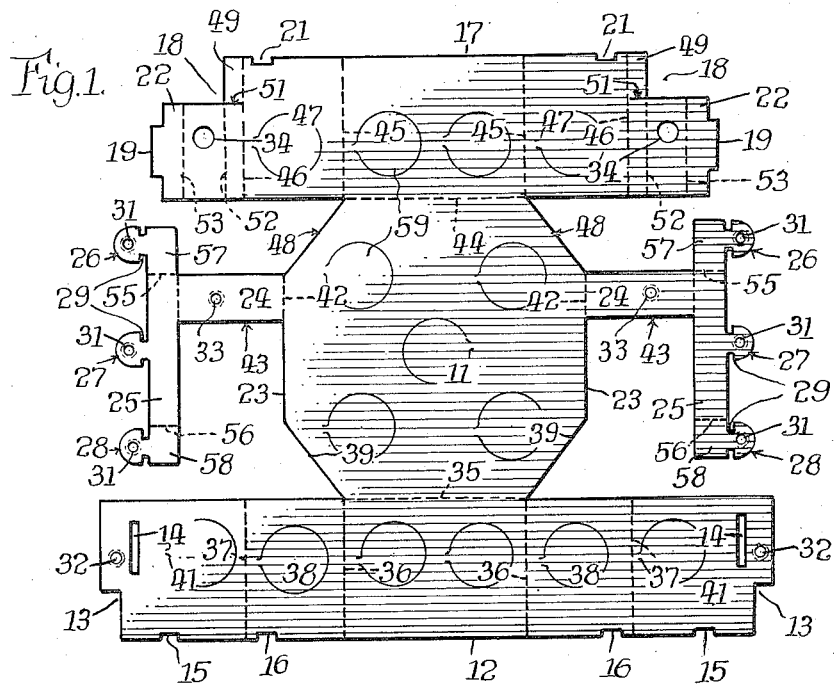
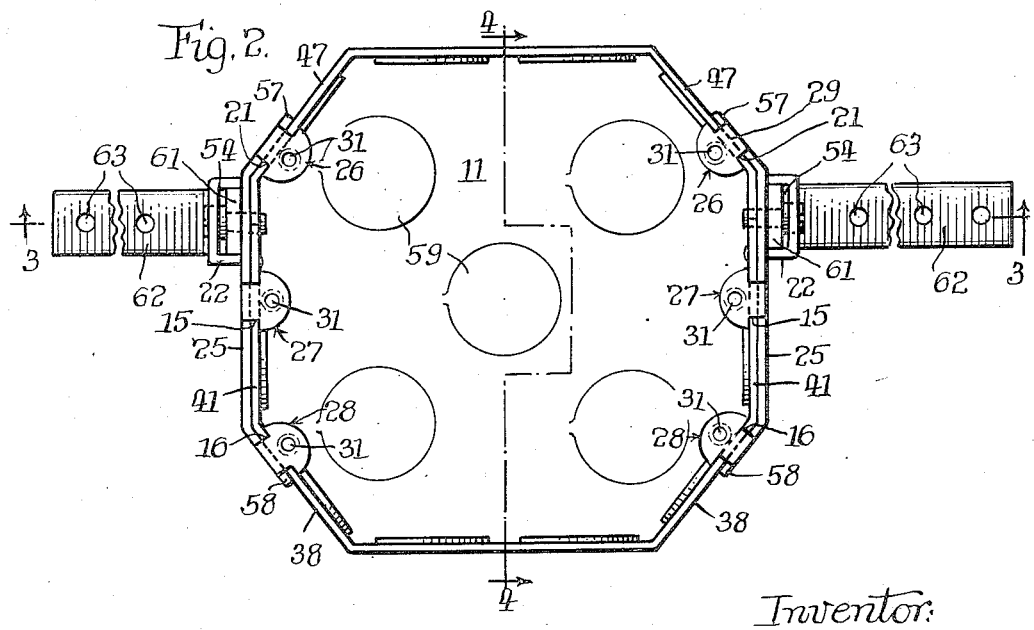
Inventor:
Christopher C. Buckels,
By Walter M. Fuller
Atty.

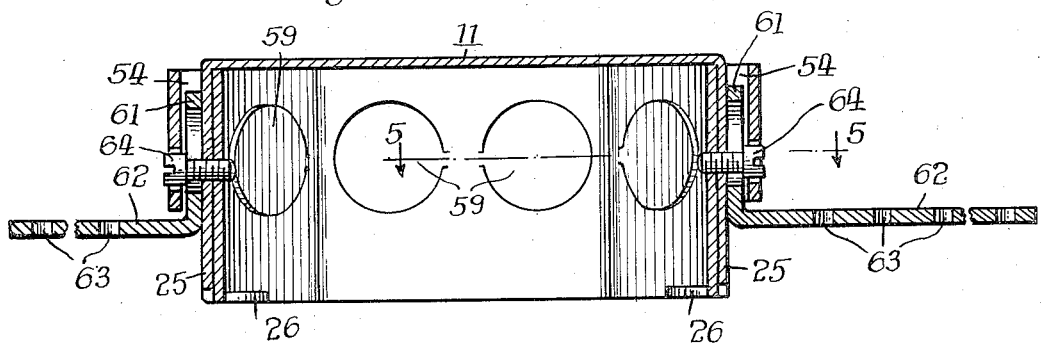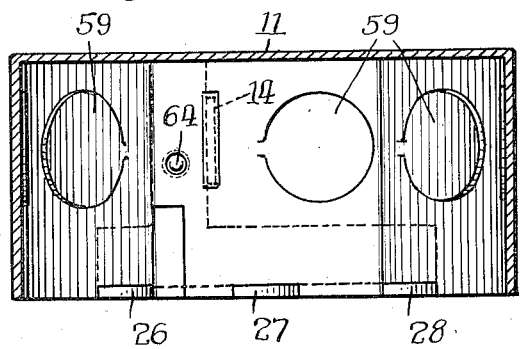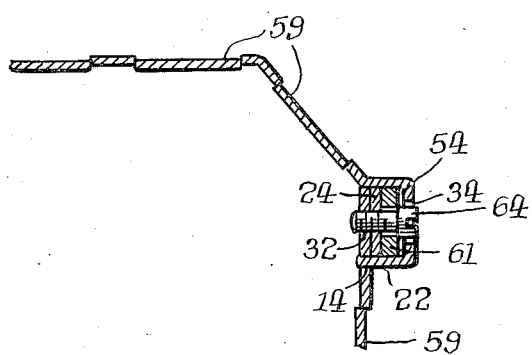

Patented Feb. 25, 1936

2,031,689

UNITED STATES PATENT OFFICE 2,031,689

OUTLET BOX

Christopher C. Buckels, Chicago, Ill., assignor of one-half to Edward E. Berthold, Chicago, Ill.

Application June 8, 1935, Serial No. 25,595

11 Claims. (Cl. 247—21)

The present invention relates to the manufacture of outlet-boxes for electrical connections, switches, etc., and concerns more particularly structures of this type which are made from folded sheet-metal and which are provided with mountings therefor affording adjustment or variation of the position of the box.

An aim of the invention is to provide a box of this kind which is of simple construction and which may be produced at relatively low cost.

A further purpose of the invention is to supply a box of this character which is universal in its adaptability for service in that it may be equipped with any of the present standard styles of covers, and its multiplicity of knock-out sections permits it to be used with pipes or conduits disposed or arranged at different locations and at various angles.

Another salient feature of the novel and improved box resides in the mounting provided therefor which furnishes a maximum range of adjustment of the box in different directions so that it may be properly and correctly installed with ease and dispatch.

To the accomplishment of these and other desirable aims and purposes, a present preferred embodiment of the invention has been devised and illustrated in detail in the accompanying drawings forming a part of this specification and to which reference should be had in connection with the following description.

Throughout the various views of these drawings like reference characters have been employed to designate the same parts.

In these drawings:—

Figure 1 is a face view of a sheet-metal blank from which the box may be made;

Figure 2 is a face view of the complete box and its adjustable mounting on a somewhat larger scale than that employed for Figure 1;

Figure 3 is a section through the box and its supporting brackets on line 3—3 of Figure 2;

Figure 4 is a cross-section on line 4—4 of Figure 2; and

Figure 5 is a fragmentary section on line 5—5 of Figure 3 illustrating the manner of fastening the box to one of the brackets.

Referring to the drawings, and more particularly to Figure 1, it will be perceived that the sheet-metal blank from which the outlet-box is made comprises a substantially-central, practically-octagonal, base-section 11, integral with one side of which is a side-wall section 12 of a length sufficient to form five of the side-wall parts of the eight-sided structure, the opposite ends of such member 12 being notched or cut away rectangularly at 13, 13, the terminal portions of such part 12 having cross-slots 14, 14 and its outer edge having recesses 15, 16, 15, 16.

The opposite margin of such base 11 has integral therewith a somewhat-shorter side-wall section 17 notched at its opposite ends at 18, 18 and having terminal projections or lugs 19, 19 of the same length as the slots 14, 14 in which they are designed and adapted to fit in the completed box.

As is fully shown, the outer edge of the part 17 has two notches or recesses 21, 21 and the same portion of the blank is cut or slit at 51, 51 forming ears 49, 49 separate from the parts 22, 22.

Member 17, although designated or characterized as a side-wall section, is of such size and shape that its end parts 22, 22 are provided for the purpose of forming sockets in the completed structure for the reception of brackets adapted to support the finished box in place.

In addition, each of the two opposite edges 23, 23 of the base, which are at right angles to the parts 12 and 17, has outstanding from one of its end portions a tongue 24 equipped at its outer end with a strip 25 integral therewith and at right-angles thereto and provided on its outer margin with three ears or tabs 26, 27, 28 joined integrally to the member 25 by necks 29 of less width than the tabs, each such tab having a screw-threaded aperture 31 therethrough.

Also, part 12 has screw-threaded holes 32, 32, parts 24, 24 similar threaded holes 33, 33, and elements 22, 22 larger unthreaded holes 34, 34.

In forming the box from such a blank, part 12 is bent up around the dotted line 35, representing one of the sides of the octagon, until it is at a right-angle to the plane of the base 11, and it is also bent along the dotted lines 36, 36 and 37, 37 to bring its parts 38, 38 between the lines 36 and 37 into register with the base-edges 39, 39 and its sections 41, 41 into register with the base-edges 23, 23.

Tongues 24, 24 are folded up along the dotted lines 42, 42 to lie against the outer faces of the sections 41, 41 with the tongue edges 43, 43 in register with the outer margins of the slots 14, 14, whereby these uncovered slots are directly adjacent to the edges of the tongues.

Part 17 is bent up along the dotted line 44 comprising one side of the octagon base and also along the lines 45 and 46 to bring its sections 47, 47 into register with the base-edges 48, 48 and the small parts or ears 49, 49 into register with the base-edges 23, 23.

Furthermore, the portions 22, 22 of the blank are folded along the dotted lines 46, 52 and 53 to form the outstanding sockets 54, 54 around the tongues 24, 24, the extensions or projections 19, 19 fitting in the slots 14, 14 and being upset or headed over inside of the box to assist in locking and securing the parts of the structure together.

The box, as thus made, has each of the sets of the three holes 34, 33 and 32 in alignment and the ears 49, 49 occupy the recesses 13, 13.

Each strip 25, at any appropriate time, is bent less than the right-angle on the dotted lines 55 and 56 to cause its terminal parts 57 and 58, equipped with the tabs or projections 26 and 28, to bear against the outer faces of the side-wall sections 47, 47 and 38, 38, respectively.

The two ears 26, 26 are bent over flat or parallel to the base with their necks or contracted parts occupying the notches 21, 21, the tabs 27, 27 are similarly folded over inwardly of the box with their necks accommodated in the marginal recesses 15, 15 of the wall sections 41, 41, and the projections 28, 28 are likewise folded over with their necks received in the notches 16, 16 of the wall sections 38, 38.

The exact order of these various sheet-metal bending operations is of no substantial importance and they may be modified or changed more or less as desirability or occasion dictates.

Thus all parts of the box are securely and adequately interlocked together without possibility of unintentional separation or disjunction.

So far as now described, the box comprises a single piece of sheet-metal formed to the desired shape, and the threaded apertures 31 of the several tabs or ears 26, 27, 28 are so located that any two or more of them may be employed for the application of a suitable standard form of cover to the box by means of screws engaging such holes.

As is customary in the trade, the box is provided with any suitable number of round sections 59, 59 both in its base and in its side-walls whose margins have been reduced in thickness of metal; that is to say, they have been partially cut out so that any one or more of the discs may be knocked out to provide the desired apertures at the correct locations for the reception of the ends of the pipes or conduits adapted to contain the wiring with which the outlet-box is to be associated.

In this connection, it should be noted that the sockets 54, 54 are at one end of the wall-sections 41, 41, thus allowing the latter to have such removable disc parts 59, 59 provided therein.

In order to permit such an outlet-box to be mounted in any one of many positions of adjustment to fulfill the required condition of suitable location for attachment to the pipe or conduit connections, each of the two sockets 54, 54 which are out of line with the center of the base and each of which is open at both ends is designed to receive in either end the slotted terminal arm 61 of a bent bracket-bar 62 having apertures 63, 63 therethrough spaced apart along the length of the bar.

Each such arm 61 is adjustably held in place in its socket by a securing screw 64 taking into the holes 32 and 33 and extended through the slot of the bracket-arm, the head of the screw occupying hole 34, whereby tightening of the screw fastens the bracket securely but yet demountably in position, its detachability permitting it to be reversed with respect to the retaining socket.

That is to say, the arm 61 may extend into its socket through either open end of the latter, and this capability coupled with the specified capacity for adjustment in the socket, provides for a great degree of variation of position of the box.

Furthermore, the brackets may be exchanged one for another, and since they are desirably of different lengths, this allows for added adjustment of the box in another direction.

Those skilled in this art will readily understand that various more or less major and minor modifications may be incorporated in the particular embodiment of the invention herein presented without departure from the heart and essence of the invention as defined by the appended claims and without the loss or sacrifice of any of the substantial or material benefits and advantages accruing from the employment of the invention.

I claim:

1. A sheet-metal outlet-box having a base and side-walls, a portion of said side-walls being formed of a member integral with said base for a part only of its length, the remainder of said side-walls being formed of another member integral for a portion only of its length with said base, tongues integral with and at substantially right-angles to said base and in substantial register with the complementary ends of said side-wall members, terminal strips integral with the upper ends of said tongues, locking tabs integral with and at approximately right-angles to said strips and having necks fitting in recesses in the top edges of the adjacent end portions of said side-wall members, one of said side-wall members at each of their meeting ends being shaped to form a bracket-socket extending only a part of the height of the box side-walls.

2. The structure presented in claim 1 in which said bracket-sockets extend around said tongues.

3. The structure presented in claim 1 in which the walls of each of said bracket-sockets extend around the corresponding tongue and in which each socket has a part fitting in an aperture through the other side-wall member.

4. The structure presented in claim 1 in which each bracket-socket is open at both ends to receive a supporting bracket part in either end.

5. The structure presented in claim 1 in which said tongues are outside of the box side-wall members except the bracket-sockets.

6. The structure presented in claim 1 in which each bracket-socket wall has a projection in an aperture through the other side-wall member.

7. The structure presented in claim 1 in which said outlet-box is of general octagonal shape and in which the walls of each of said bracket-sockets extend around the corresponding tongue, the socket having a part fitting in an aperture through the other side-wall member, each of said sockets being open at both ends to receive a bracket part in either end and in which a line through the centers of said bracket-sockets is off center with respect to the center of the box-base.

8. A sheet-metal outlet-box having a base, side-walls, a pair of bracket-sockets on its outside and a line through the centers of which is at one side of the center of the base, a pair of brackets of different lengths adapted to support said outlet-box and having bent ends accommodated adjustably in said sockets, and means to hold said bracket ends in different positions of adjustment in said sockets, said brackets having spaced holes therethrough along their lengths.

9. The structure presented in claim 8 in which said sockets extend only partway up the height of said side-walls.

10. The structure presented in claim 8 in which each bracket-socket is open at both ends and adapted to receive the bracket ends in either end of the socket.

11. The structure presented in claim 8 in which said bracket-sockets extend only partway up the height of the side-walls and in which the brackets are interchangeable with one another in their sockets to modify the position of the supported box and in which each bracket-socket is open at both ends and adapted to receive its bracket end in either end of the socket.

CHRISTOPHER C. BUCKELS.